March 8, 1932. C. K. KNIGHT 1,848,356
WINDSHIELD CLEANER
Filed March 2, 1928 2 Sheets-Sheet 1
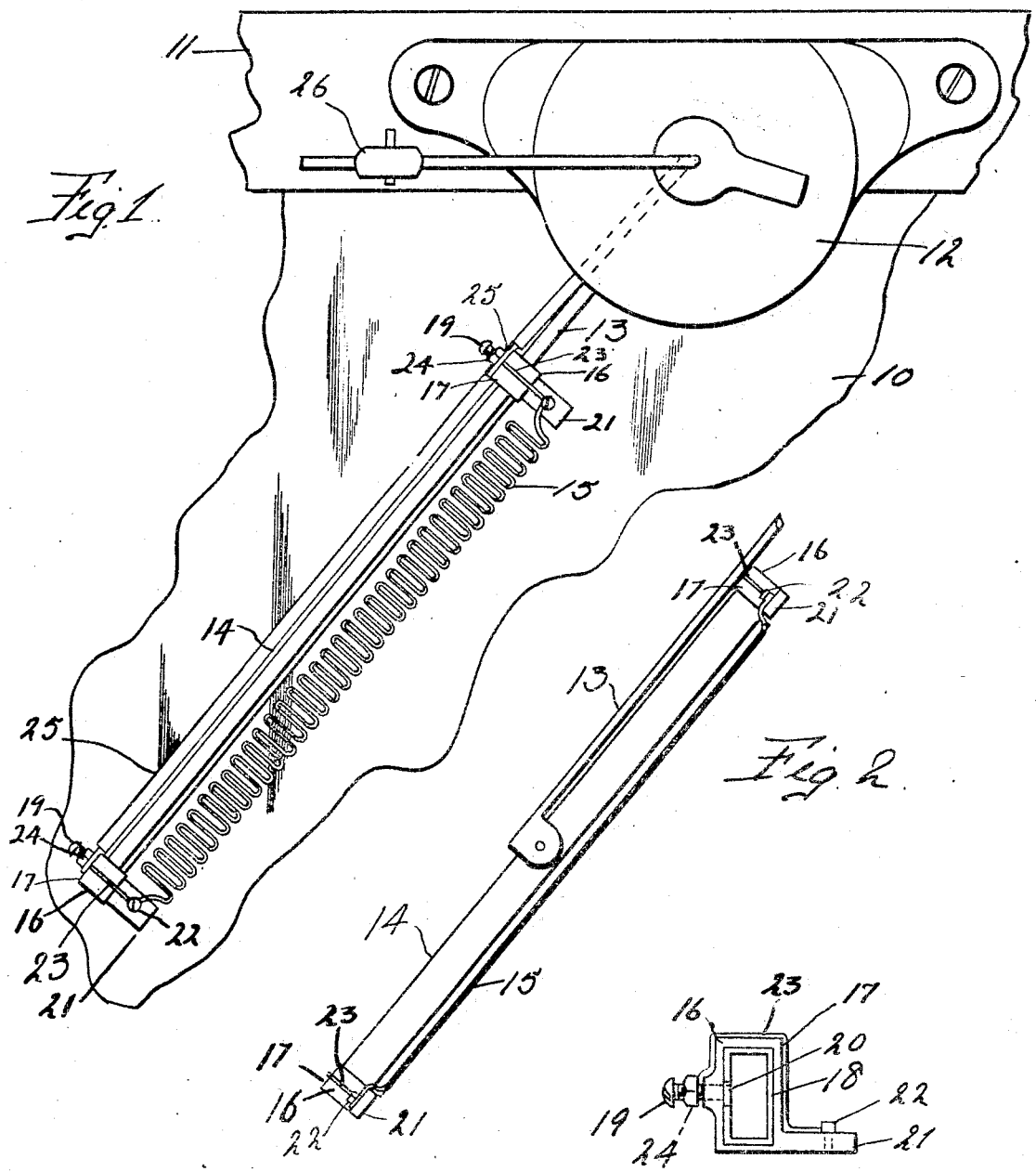
INVENTOR
Charles Kelly Knight
By W. W. Williamson
Atty.

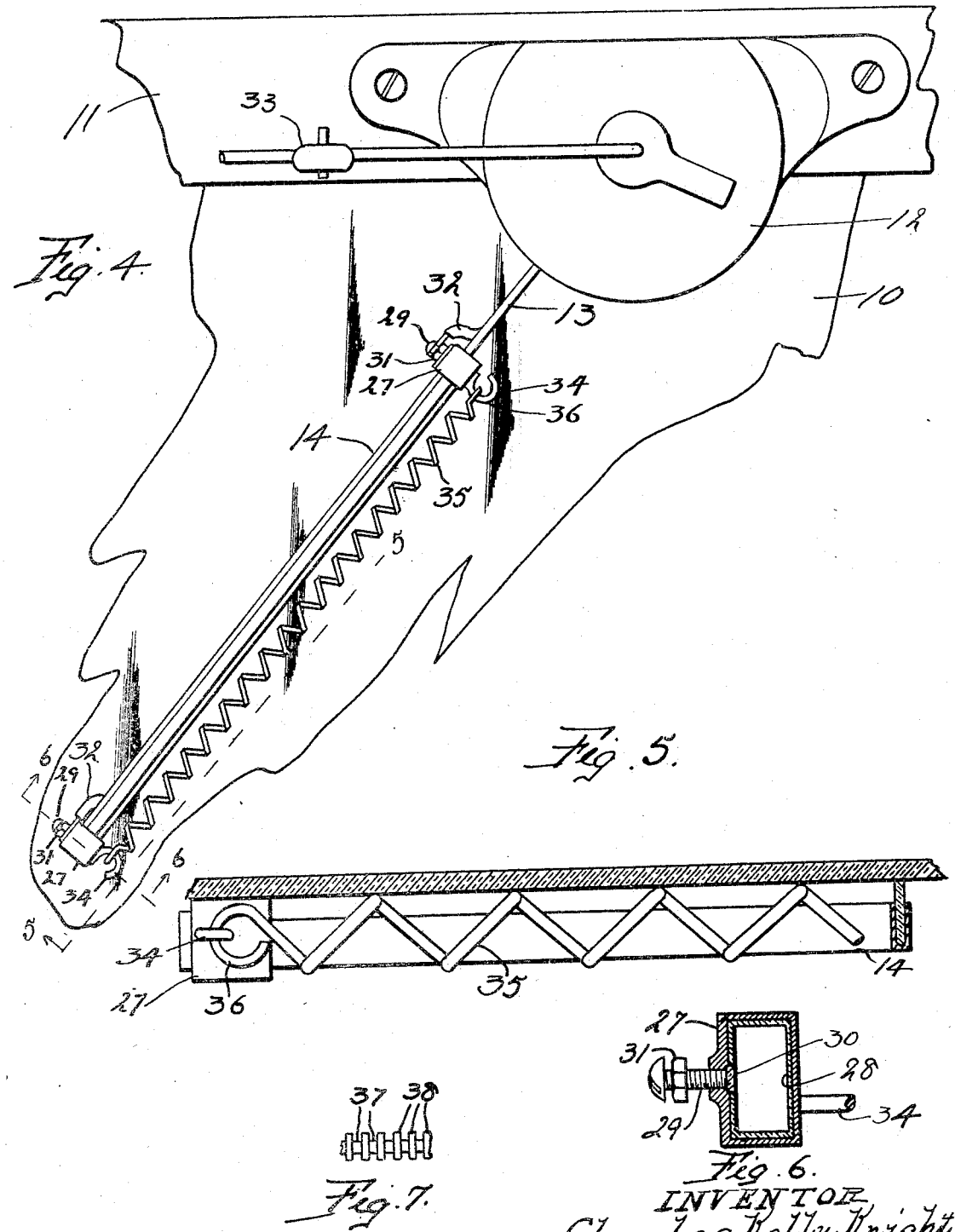

Patented Mar. 8, 1932

1,848,356

UNITED STATES PATENT OFFICE

CHARLES KELLY KNIGHT, OF UPPER DARBY, PENNSYLVANIA

WINDSHIELD CLEANER

Application filed March 2, 1928. Serial No. 258,453.

My invention relates to a new and useful improvement in a wind shield cleaner and has for its primary object to provide in combination with a wiper or squeegee, a heating element that can be supported in such close proximity to the wind shield as to actually contact ice on the surface of the wind shield and thus melt the same so that it may be wiped away by the squeegee.

Another object of my invention is to provide a heating element which may be readily and quickly placed upon or removed from the wind shield wiper thereby permitting storage of the same when weather conditions are such that is unnecessary to use the heating element.

A further object of my invention is to provide a heating element for this purpose of unique construction whereby an extended heating surface is furnished in order to quickly melt the ice as the cleaner passes to and fro across the wind shield.

A still further object of the invention is to provide certain fittings to adapt the heating element for attachment to present-day wind shield wipers.

With these ends in view, this invention consists in the details of construction and combination of elements hereinafter set forth and then specifically designated by the claims.

In order that those skilled in the art to which this invention appertains may understand how to use and make the same, I will describe its construction in detail referring to numerals by the accompanying drawings forming a part of this application, in which:

Fig. 1 is a fragmentary elevation of the rear face of a wind shield and its frame showing a wind shield cleaner embodying my invention mounted thereon.

Fig. 2 is a side elevation of the wind shield wiper or squeegee with a portion of its arm connected therewith and illustrating the relation of the heating unit thereto.

Fig. 3 is an enlarged edge of one of the clamps.

Fig. 4 is a view similar to Fig. 1, illustrating a slightly different form of heating unit.

Fig. 5 is an enlarged fragmentary section of the structure shown in Fig. 4 along approximately the line 5—5 of Fig. 4.

Fig. 6 is a further enlarged sectional view of one of the clamps used in the modification on the line 6—6 of Fig. 4.

Fig. 7 is a fragmentary elevation of another form of heating element.

In carrying out my invention as herein embodied, 10 represents the glass portion of an automobile wind shield which is suitably glazed in a frame 11, the top rail of which is herein illustrated. On such frame 11 is generally mounted the actuating portion 12 of a wind shield cleaner and said actuating portion may be an electrically, vacuum, manually or otherwise operated device to which is connected an arm 13 for oscillation or reciprocation across the front face of the transparent or glass portion of the wind shield and said arm carries a wiper 14 such as a squeegee of rubber or other suitable material whereby accumulations of moisture may be wiped from the surface of the glass over which it is moved.

During sleet storms or when the weather conditions are such that rain falling upon a wind shield glass will freeze, the vision of the operator of an automobile is obscured, thus practically preventing operation of the vehicle unless the wind shield is opened, because the usual wiper has absolutely no effect in preventing accumulations of ice or the removal of such accumulations, but I have found that if this accumulation of ice can be melted in the path of travel of the wiper, then the resulting moisture can be wiped aside.

I have also found that under most conditions, it is necessary to provide an extended heating surface and that the heating element must practically be in contact with the ice to be effective. I have also found that under some conditions such as when the weather is just below the freezing point so that a small quantity of heat is effective, then the heating element need not have such a large extended surface, but be so formed as to melt grooves in the ice so that the wiper has a tendency to break the ice into small particles between the grooves and in wiping them from side to side will cause the particles to drop off.

The preferred method of applying the necessary heat to melt the ice from the glass is to produce a flat heating element 15, Figs. 1 and 2, composed of small uncovered wire bent back and forth upon itself in the same continuous plane as shown in Fig. 1, thus providing an extended effective area without greatly obscuring or affecting the driver's vision.

The heating element 15 may be secured to or detachably connected with suitable supports 16 fixed or removably and adjustably mounted upon the wiper or squeegee 14. The supports here shown are in the form of clamps, each comprising a body 17 of sufficient size to encircle the wiper or squeegee 14 and more particularly the metal part of the squeegee, it being understood that the rubber wiping element may be cut out where the clamps are to be fastened should this be necessary. Within the body 17 of each clamp is a cover of insulating material 18 so as to insulate the clamp from the metallic portion of the wiper and in said body is threaded a screw 19 carrying an insulated jaw 20 at its inner end so that by threading the screw 19 inward, the squeegee will be clamped between the jaw 20 and the wall of the clamp body opposite said jaw. From the body of the clamp projects an extension 21 carrying a suitable binding post or screw 22 by which the ends of the heating element 15 may be fixed or detachably connected with the clamps, and where the clamps are of material having electrical conductivity, said clamps may be used for conducting the current to or from the heating element as the case may be or other conductors 23 may be provided for carrying the current between the binding post 22 and the screws 19.

The screws 19 may also be used as binding posts by providing the same with nuts 24 so that the lead wires 25 may be fastened in place. It is to be understood that the lead wires may be in a single cable running to any suitable source of supply and may first pass to the axis of the arm 13 and then connected with the source of electrical energy and at some suitable location in the lead wires there may be positioned a switch 26, and while the latter is here shown as a manually actuated one, it will be obvious that said switch might be a part of the actuating mechanism or portion 12 of the cleaner so that when the latter is placed in operative condition, the current will be immediately supplied to the heating element providing the same is in place upon the wiper.

From the foregoing description, it will be obvious that when the wiper is equipped with the heating element and the latter so arranged or supported that it will contact with any ice formation on the wind shield and the current is turned on, the heat produced by the extended heating surface will melt the ice as the wiper is reciprocated across the wind shield. As soon as the ice is reduced to water, the latter will be wiped to one side by the squeegee.

While the construction of the supports or clamps for the heating element is immaterial to the operation of the device, the structure shown is such that the heating element is brought into close proximity to the surface of the wind shield glass with the broad side thereof in the same plane as the wiping edge of the rubber portion of the squeegee.

The same general idea is carried out in Figs. 4 to 6 inclusive wherein clamps 27 are mounted upon the squeegee or wiper 14 but insulated from the metal portion thereof by a sheet or strip of insulating material 28 around the inside, said clamp being held in place by a screw 29 having threaded connection with the clamp and provided on its inner end with an insulated jaw 30 similar to the construction referred to in connection with the preferred form of my invention and on this screw is a nut 31 to bind the lead wires 32 on the clamps, said lead wires being arranged in any suitable manner as for instance first running to the axis of the arm 13 and then to the source of electrical energy with a switch 33 interposed at some suitable point.

The brackets carry hooks 34 or equivalent attaching means for connection with the ends of the heating element 35 which ends are preferably looped or formed to provide eyes 36.

The heating element in this form of the invention is shown as a coil of small uncovered wire having the proper resistance properties for the purpose for which it is to be used.

While, as before stated, the flat coil formation of the heating element has many advantages over a convolute one if the weather conditions are not too severe, the last mentioned form of heating element will melt grooves in the ice wherever the convolutions contact therewith so that said ice is cut up into small strips and the rubber wiping element then striking against the edges of these little strips of ice tend to slide them along the glass and finally cause them to break up into small particles which will drop off of the glass.

Another form of heating element that can be used to some advantages is shown in Fig. 7 wherein a strip of suitable resistance material, either round or flat, has a number of parallel grooves 37 cut therein either at right angles to the axis of the strip or in any other position so as to provide a plurality of spaced ribs 38. The ends of this heating element being suitably connected with a source of electrical energy and mounted on a wind shield cleaner such as herein illustrated and described will have its temperature raised to a sufficient degree to melt ice with which it contacts and under some conditions will melt grooves in a sheet of ice on a wind shield, while on the other conditions it will actually melt all of the ice over which it passes, the same as contemplated in connection with my preferred form, and as the ice is melted, the water produced will be wiped from the wind shield by the squeegee.

I desire to call particular attention to the fact that I have found during my experience that it is necessary and essential from a practical standpoint that the heating element actually contact with the ice to be melted. This is necessary because a wire small enough not to interfere with an operator's vision will not emit sufficient heat to melt the ice when held a short distance therefrom and if the heating element is surrounded by a casing of any kind, the effective surface of said heating element is diminished to such an extent, that it becomes practically worthless.

One of the main advantages of the construction herein set forth is that the heating element may be readily removed and stored when not in use.

Of course I do not wish to be limited to the exact details of construction as herein shown, as these may be varied within the limits of the appended claims without departing from the spirit of my invention.

Having thus fully described my invention, what I claim as new and useful is:—

1. A wind shield cleaner comprising, in combination, a reciprocating wiper, and a heating element of small uncovered wire whereby visibility is practically unimpaired, said heating element carried by the wiper.

2. A wind shield cleaner having, in combination, a wiper for reciprocation across a surface to be cleaned, and a heating element carried by said wiper and consisting of small uncovered wire bent back and forth upon itself in the same continuous plane.

3. A wind shield cleaner having, in combination, a wiper for reciprocation across a wind shield, electrical connections carried by the wiper, and a heating element of small uncovered wire detachably mounted upon the wiper and adapted to be joined to the electrical connections.

4. A wind shield cleaner having, in combination, a wiper mounted upon the wind shield of a vehicle and adapted to reciprocate across a face thereof, brackets carried by the wiper, a heating element comprising thin uncovered wire detachably connected to the brackets and positioned at one side of the wiper with the effective portion of said heating element substantially in the same plane as the working edge of the wiper.

5. A wind shield cleaner, having, in combination, a wiper including a squeegee element, brackets detachably and adjustably mounted upon the squeegee element of the wiper, and a heating element detachably connected to the brackets whereby said heating element may be removed and stored when not in use.

6. In a device of the character stated, the combination with a wind shield wiper including a wiping element for contact with the surface to be cleaned, brackets detachably and adjustably mounted on the wiper, means to insulate the brackets from the wiper, and a heating element comprising a thin uncovered wire bent back and forth upon itself throughout a continuous plane and detachably connected with the brackets with a broad side thereof in substantially the same plane as the effective working surface of the wiping element.

7. A wind shield cleaner having, in combination, a wiper, means for reciprocating the wiper, brackets adjustably and detachably connected with the wiper, and a coil detachably connected with the brackets with the effective portions thereof in substantially the same plane as the effective working surface of the wiper.

In testimony whereof I have hereunto affixed my signature.

CHARLES KELLY KNIGHT.